Dec. 12, 1933.  H. PELLETIER  1,939,409
ANTISHIMMYING DEVICE
Filed Sept. 12, 1932
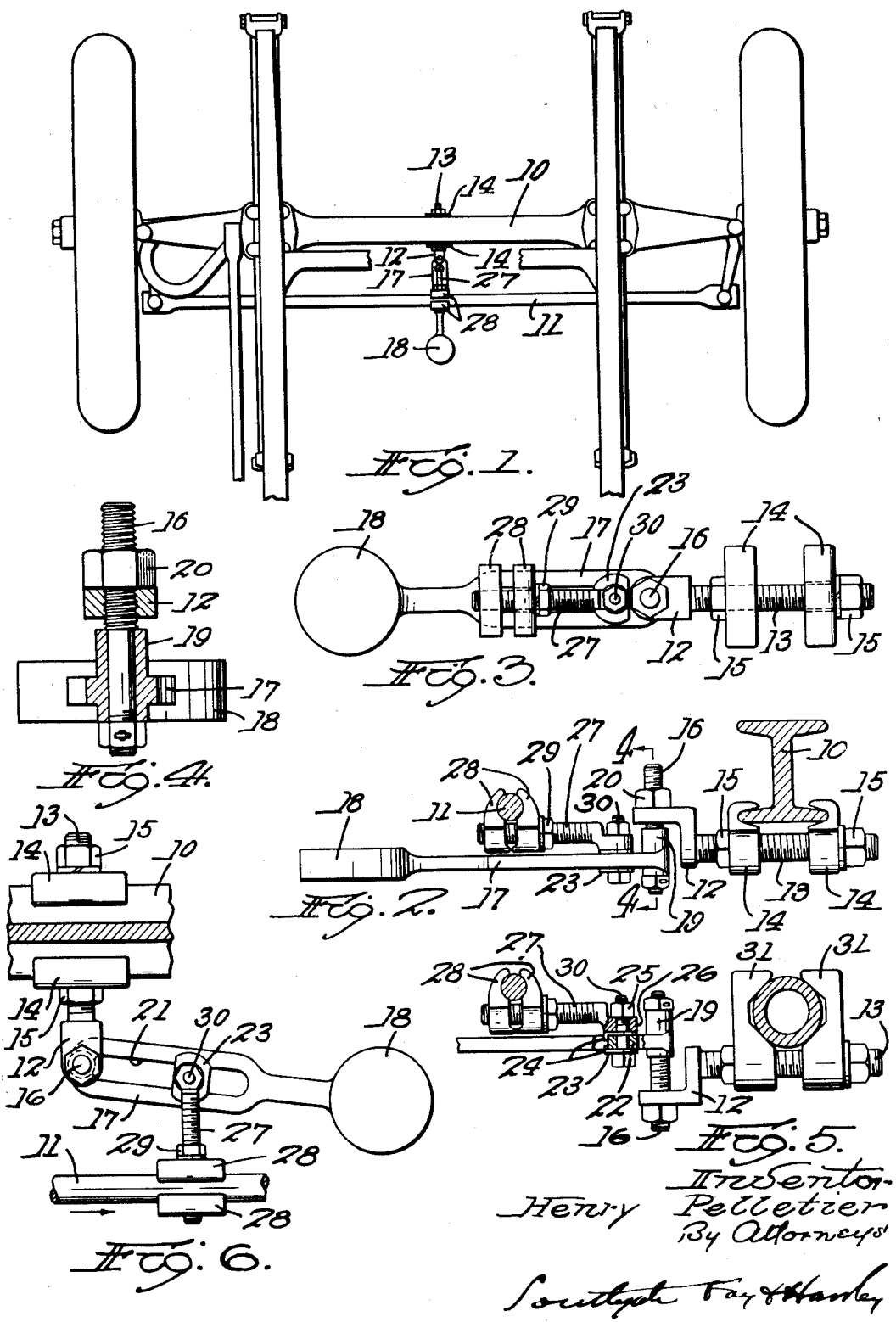

Patented Dec. 12, 1933

1,939,409

UNITED STATES PATENT OFFICE 1,939,409

ANTISHIMMYING DEVICE

Henry Pelletier, Fitchburg, Mass.

Application September 12, 1932
Serial No. 632,771

10 Claims. (Cl. 280—89)

This invention relates to an attachment for an automobile and the principal object of the same is to provide means for preventing the shimmying of the front wheels and steering column.

Other objects of the invention are to provide a construction in which a weight is provided connected with the steering rod by a compound leverage system in which the effect of the weight on the steering tie rod during ordinary driving will be multiplied many times; to provide a construction in which the weight trails behind the steering tie rod and acts as a force for damping any vibrations due to attempted shimmying and reducing those vibrations so that they will not constitute a disagreeable action and will not result in any danger to the steering of the car; to provide a construction in which the weight is mounted well in the rear of the axle to give it a rudder-like effect to keep the front wheels in perfect line at all times; to provide this construction of weight so located and so connected with the steering tie rod that in case of a blowout on a front wheel, it will prevent the car from swerving to one side or the other and thus constitute a very important safety device; and to provide a construction which may be adjusted in a number of different ways so as to make it applicable to cars of different kinds so that it is practically applicable to all types of cars.

Other objects and advantages of the invention will appear hereinafter.

Reference is to be had to the accompanying drawing, in which

Fig. 1 is a plan of the steering portion of a car with a preferred embodiment of this invention applied thereto;

Fig. 2 is a side elevation of the attachment with the axle and steering rod to which it is connected shown in section;

Fig. 3 is a plan of the attachment detached from the car;

Fig. 4 is a sectional view on the line 4—4 of Fig. 2;

Fig. 5 is a view similar to Fig. 2 showing a slightly modified form of the device adjusted for an entirely different car, in which the steering rod is located at a different elevation relative to the axle; and Fig. 6 is a view of the device shown in Fig. 1 indicating a position the parts assume on making a sharp left turn.

The invention is illustrated as applied to the chassis of a car having a stationary axle 10 and a shiftable steering tie rod 11 connected with the front wheels in the usual manner. A bracket 12 is employed having a horizontal screw 13 extending forward from it and provided with two jaws 14, one screw-threaded on this screw and the other pivoted thereon and adapted to grasp the bottom of the axle or any other part of it. A check nut 15 is used to hold the jaws in clamping position. By comparison of Figs. 2 and 5, it will be seen that this bracket can be turned either side up so as to adjust the arrangement for steering tie rods located in different vertical positions relative to the axle.

Connected with the bracket 12 by an adjustable vertical screw 16 which passes through the bracket is a weight lever 17 which has a weight 18 at its rear end. This lever 17 is pivoted to turn freely on the rod 16 which is screw-threaded at both ends but has a cylindrical portion on which the hub 19 of this lever 17 is freely pivoted as stated. Nuts 20 and check nuts are employed to prevent the lever 17 getting out of adjustment. It will be obvious that it can be adjusted up and down in either of the positions shown in Figs. 2 and 5 and a lengthy adjustment can be secured by inverting the bracket 12.

The lever 17 is provided with a longitudinal slot 21 arranged lengthwise and machined. In this slot is located a slide 22 which is formed of three pieces, one of which is of the same width as the slot and located entirely in the slot and the other two are in the form of washers which slide on the opposite surfaces of the slot. These parts are not adjustable relatively to each other. The washers 23 have ears 24 projecting down into the slot to prevent the washers from turning. A bolt 30 passes through this slide and is provided with nuts 25 at both ends. Between one of these nuts and one of the washers is a perforated head 26 which is fixed with respect to the nut but rotatable with respect to the slide as the bolt passes through the slide freely. This head is provided with a horizontal screw arm 27 and on this screw are a pair of jaws 28 for securing this arm 27 to the steering tie rod 11. One of these jaws is screw-threaded to the arm 27 and a check nut 29 is provided on the inner side for holding the parts in adjusted position.

In the normal operation of the device, the parts are in the position shown in Figs. 1, 2 and 3. That is, the levers 17 and 27 are in alignment with each other while the slide 22 is located at the front end of the slot 21. This is the position the parts assume when the device is being used in ordinary driving straight ahead. The compound lever 17, 27 has a ten to one leverage in the form illustrated and the distance from the center of the slide 22 and the bolt 30 to the center of the adjusting screw 16 can be made three quarters of an inch while the distance from the center of the screw 16 to the center of the weight 18 can be made seven and a half inches, making a ratio of ten to one. If the weight weighs one and three quarters pounds, this gives a resistance against the short end of the lever of seventeen and a half pounds one way and really twice that, or thirty-five pounds, when it starts to oscillate back and forth. Yet this does not affect the steering because when the wheels are pulled out of line slightly, the fulcrum of leverage which is, at the start, ten to one is changed by the sliding of the slide 22 and bolt 30 in the slot to a central position thereon in which the leverage is three and three quarters on both sides, leaving no resistance when the wheels are making a turn. In other words, the resistance to the shimmying of the car is multiplied and is very great but there is no resistance when the wheels are really turned to round a corner or avoid something in the road.

The weight 18, located well in the rear, has a tendency to bring the wheels into a straight line if they are moved slightly out of it because at that time the slide 22 and bolt 30 are at the end of the slot as shown in Fig. 3. It is absolutely necessary to have a leverage in this device not only for power but to provide for perfect straight traveling in a forward direction. For example, if the bolt 30 moves a quarter of an inch on account of the compound leverage, the weight will travel back and forth three inches with the resistance on the rod of thirty-five pounds. The idea is that in traveling it takes a certain length of time for the weight to swing which gives time to damp the slightest vibration due to shimmying. It has been found in practice by subjecting the device to the most severe tests that it is one hundred percent perfect as an anti-shimmying device.

The clamps 14 and 28 can be changed as desired to fit any axle or tie rod and the vertical and horizontal adjustments can be made to fit any relative location of them. In the one shown in Fig. 5, the clamps or jaws 31 are of a different shape from those shown in Fig. 2.

It will be seen that this construction provides for the difficulties that actually exist, prevents shimmying perfectly and yet affords no resistance to an intentional turning of the machine to round a corner or for the purpose of avoiding an object in the highway.

Although I have illustrated and described only two forms of the invention, I am aware of the fact that modifications can be made therein by any person skilled in the art without departing from the scope of the invention as expressed in the claims. Therefore, I do not wish to be limited to all the details of construction herein shown and described, but what I do claim is:—

1. In an anti-shimmying device, the combination of a clamp adapted to be fixed to the axle of a car, a lever pivotally connected with said clamp and having a weight on the end normally extending directly backwardly from the clamp, and an arm pivotally and slidably connected to said lever and having a clamp thereon for securing it to the steering tie rod of the car.

2. In an anti-shimmying device for an automobile, the combination of a bracket, means for adjustably securing the bracket to the axle of a car, a vertical pivot screw connected to said bracket, a lever having a weight on the end freely pivoted to said screw and extending backwardly therefrom, and an arm pivotally and slidably connected to said lever and adjustably secured to the steering tie rod of the car, both of said adjustments being longitudinal.

3. In an anti-shimmying device, the combination of a bracket adapted to be longitudinally adjustably secured to the axle of a car and extending backwardly therefrom, a vertically adjustable screw secured to the rear end of said bracket, a lever pivotally mounted on said screw and having a weight on the end at the rear and free to swing on the screw, an arm pivotally and slidably connected by a vertical pivot with the lever and extending backwardly and adapted to be secured to the steering tie rod of the car.

4. In an anti-shimmying device, the combination of a bracket having a horizontal screw thereon, means for securing said screw to the axle of a car, said bracket being reversible by turning the screw through a half turn, a vertical screw mounted on the bracket and adapted to extend upwardly or downwardly therefrom and to be adjusted vertically, said screw having a cylindrical portion, a hub freely turnable on the cylindrical portion of the screw and having an integral lever extending directly backwardly therefrom and provided with a weight at the extreme rear end, a longitudinal slide on the lever, said slide having a vertical pivot and an arm pivotally mounted on the vertical pivot and adapted to be securely connected with the steering tie rod of the car.

5. In an anti-shimmying device, the combination of a vertical pivot screw, means for mounting this pivot screw on the axle of a car, a lever mounted on said screw to turn freely thereon and having a weight on the extreme end, said lever extending directly backwardly from the screw, said lever having a longitudinal guide thereon, a slide freely slidable along said guide and having a vertical pivot, an arm pivotally mounted on the pivot and extending backwardly therefrom and having means for securing it to the steering tie rod of the car, whereby when the front wheels connected with the steering tie rod vibrate, that vibration will be damped and absorbed by the weight, said pivot being located in ordinary driving only a short distance back of the pivot screw, whereby when the front wheels are turned, the slide will have to move in a relative backward direction along the guide, so that the weight will not prevent or restrict the turning of the car.

6. In an anti-shimmying device for an automobile, the combination of a vertical pivot rod adapted to be fixed to the front axle of a car, a lever freely pivoted on the rod and having a weight at the rear end, said lever having a slot longitudinally located, a slide freely slidable in said slot and carrying a vertical bolt, and an arm freely pivoted on said bolt and having means for fixing it to the steering tie rod of the car, whereby in straight driving the weight will resist the shimmying of the wheels but in turning the slide will necessarily move along the slot and reduce the leverage of the weight so that the weight will not resist turning movement.

7. In an anti-shimmying device for an automobile, the combination of a pivot rod adapted to be fixed to the front axle of a car, a lever freely pivoted on the rod and having a weight at the rear end, said lever having a slot longitudinally located, a slide freely slidable in said slot, and an arm freely pivoted to said slide and having means for fixing it to the steering tie rod of the car.

8. In an anti-shimmying device, the combination of a pivot screw, means for mounting said pivot screw on the axle of a car, a lever mounted on said screw to turn freely thereon and having a weight at the extreme rear end, said lever having a longitudinal guide thereon, a slide freely slidable along said guide, an arm pivotally connected with the guide and extending backwardly therefrom and having means for securing it to the steering tie rod of the car, the point at which the arm is pivotally connected with the guide being located in ordinary driving only a short distance back of the pivot screw, whereby when the front wheels are turned, the slide will have to move in a relative backward direction along the guide, so that the weight will not prevent or restrict the turning of the car.

9. In an anti-shimmying device, the combination of a bracket, means for securing said bracket to the axle of a car, a screw mounted on the bracket and adapted to be adjusted vertically, a hub freely turnable on the screw and having an integral lever extending backwardly therefrom and provided with a weight at the extreme rear end, a longitudinal slide on the lever, and an arm pivotally connected with the slide and adapted to be securely connected with the steering tie rod of the car.

10. In an anti-shimmying device for an automobile, the combination of a bracket, means for securing the bracket to the axle of a car, a pivot connected to said bracket, a lever having a weight on the end freely connected with said pivot and extending backwardly therefrom, and an arm pivotally and slidably connected to said lever and secured to the steering tie rod of the car.

HENRY PELLETIER.